US012687418B2

(12) United States Patent
Lenk

(10) Patent No.: US 12,687,418 B2
(45) Date of Patent: Jul. 21, 2026

(54) ARRANGEMENT OF A SENSOR IN A HOLDING DEVICE HAVING A DOUBLE RING SEAL, SENSOR, AND METHOD FOR MOUNTING A SENSOR

(71) Applicant: VEGA GRIESHABER KG, Wolfach (DE)

(72) Inventor: Fritz Lenk, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 420 days.

(21) Appl. No.: 18/095,223

(22) Filed: Jan. 10, 2023

(65) Prior Publication Data

US 2023/0258490 A1 Aug. 17, 2023

(30) Foreign Application Priority Data

Jan. 18, 2022 (EP) .................................... 22152046

(51) Int. Cl.
| | |
|---|---|
| *G01D 11/24* | (2006.01) |
| *F16J 15/02* | (2006.01) |
| *G01F 23/284* | (2006.01) |

(52) U.S. Cl.
CPC .......... *G01F 23/284* (2013.01); *F16J 15/021* (2013.01)

(58) Field of Classification Search
None
See application file for complete search history.

(56) References Cited

U.S. PATENT DOCUMENTS

| | | | |
|---|---|---|---|
| 8,890,759 B2 | 11/2014 | Pantea et al. | |
| 11,112,326 B2 | 9/2021 | Kreis | |

| | | | | |
|---|---|---|---|---|
| 2003/0030517 | A1* | 2/2003 | Munley | ..................... H01P 1/08 333/252 |
| 2004/0200276 | A1* | 10/2004 | Lenk | ..................... G01F 23/284 73/866.5 |
| 2010/0079348 | A1* | 4/2010 | Dietmeier | ............ H01Q 1/2233 343/784 |
| 2015/0241261 | A1* | 8/2015 | Cheng | ................... G01F 23/284 342/124 |
| 2015/0362354 | A1* | 12/2015 | Schultheiss | ........... G01F 23/284 342/124 |

(Continued)

FOREIGN PATENT DOCUMENTS

| | | | | |
|---|---|---|---|---|
| DE | 102016123218 | A1 | 12/2016 | |
| DE | 102016212220 | A1 | 1/2017 | |
| DE | 102021109644 | A1 * | 10/2022 | ............. G01D 11/30 |

OTHER PUBLICATIONS

EPO Extended European Search Report for application EP 22152046.3 issued on Jun. 21, 2022.

*Primary Examiner* — Alexander A Mercado
(74) *Attorney, Agent, or Firm* — William Gray Mitchell

(57) ABSTRACT

An arrangement of a sensor in a holding device, the holding device having a passage opening and the sensor having a process connection at least partially inside the passage device, which achieves a reliable seal between the sensor and the holding device, wherein the holding device has an internal taper in a sub-region of the passage opening and the process connection has an external taper in a sub-region, which is constructed in a manner corresponding to the internal taper of the holding device and comes to bear against the same, wherein the external taper has a first section and a second section, wherein the first section and the second section are constructed from different materials.

10 Claims, 2 Drawing Sheets

(56)     References Cited

U.S. PATENT DOCUMENTS

2017/0141474 A1\*  5/2017  Hengstler  .............. H01Q 1/125
2018/0113020 A1\*  4/2018  Fredriksson  .......... G01F 23/284
2021/0190620 A1\*  6/2021  Kreis  ..................... G01L 19/14

\* cited by examiner

1

ARRANGEMENT OF A SENSOR IN A HOLDING DEVICE HAVING A DOUBLE RING SEAL, SENSOR, AND METHOD FOR MOUNTING A SENSOR

CROSS REFERENCE TO RELATED APPLICATIONS

This patent application claims priority to European Patent Application 22152046.3, filed on Jan. 18, 2022.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is an arrangement of a sensor in a holding device.

Background of the Invention

Various types of sensors are known from the prior art. The present document is concerned with a sensor for detecting a property of filling material in a container or tube, particularly a pressure sensor, limit level sensor or fill level sensor.

Various options for fastening a sensor to a container are known from practice. Usually, the sensor has what is known as a process connection to fasten the sensor to the container indirectly or directly. For fastening, the sensor is inserted into a holding device, in order to protrude through a container wall.

In the field of food technology or the pharmaceutical industry, high hygiene requirements prevail. In this case, it should be prevented with very high reliability, that filling material poured into a container becomes contaminated. The region between a sensor and a previously mentioned holding device is conceivable as a gateway for contaminants. Usually, one or more seals are inserted between the sensor and the holding device for sealing against the pressure exerted by gases or fill level and to prevent contaminants from passing from the outside between the sensor and the holding device process connection in the direction of the container interior.

The invention is based on the object of providing an arrangement, a sensor and a method, by means of which a particularly reliable seal can be achieved between a sensor and a holding device.

The object is achieved according to the invention using the features of the independent claims. Further practical embodiments and advantages are described in connection with the dependent claims.

2

BRIEF SUMMARY OF THE INVENTION

In a preferred embodiment, an arrangement of a sensor (10) in a holding device (12), the holding device (12) having a passage opening (24) and the sensor (10) having a process connection (26), which is arranged at least partially inside the passage opening (24), characterized in that the holding device (12) has an internal taper (32) in a sub-region of the passage opening (24) and the process connection (26) has an external taper (34) in a sub-region, which is constructed in a manner corresponding to the internal taper (32) of the holding device (12) and comes to bear against the same, wherein the external taper (34) has a first section (36) and a second section (38), wherein the first section (36) and the second section (38) are constructed from different materials.

In another preferred embodiment, the arrangement as described herein, characterized in that the first section (36) is constructed from a dielectric material.

In another preferred embodiment, the arrangement as described herein, characterized in that the first section (36) is part of a lens (20).

The arrangement according to one of the preceding claims, characterized in that the second section (38) is constructed from metal.

In another preferred embodiment, the arrangement as described herein, characterized in that the second section (38) is formed by a housing of the sensor.

In another preferred embodiment, the arrangement as described herein, characterized in that the metal is provided with an abrasion coating on the outside.

In another preferred embodiment, the arrangement as described herein, characterized in that the external taper (34) has a smaller angle in relation to the axial direction than the internal taper (32).

In another preferred embodiment, the arrangement as described herein, characterized in that the sensor (10) and correspondingly the holding device (12) form a stop (42), which delimits the maximum insertion depth of the sensor (10) into the holding device (12).

In another preferred embodiment, a sensor having a process connection (26) for mounting the sensor (10) in a holding device (12), wherein the process connection (26) has an external taper (34) and wherein the external taper (34) has a first section (36) and a second section (38), which are constructed from different materials.

In another preferred embodiment, the sensor as described herein, characterized in that the first section (36) is constructed from a dielectric material.

In another preferred embodiment, the sensor as described herein, characterized in that the second section (38) is constructed from metal.

In another preferred embodiment, a method for mounting a sensor (10) in a holding device (12) having a passage opening (24), wherein when inserting the sensor (10) into the holding device (12), an internal taper (32) of the holding device (12) and an external taper (34) of the sensor (10) are arranged such that they bear against one another and a first section (36) and a second section (38) of the external taper (34) are pressed against the internal taper (32) and thus a double annular seal is created.

In another preferred embodiment, the method as described herein, characterized in that the maximum insertion depth of the sensor (10) into the holding device (12) is defined by a stop (42) and/or a maximum screw-in force.

DETAILED DESCRIPTION OF THE INVENTION

Figure 1:
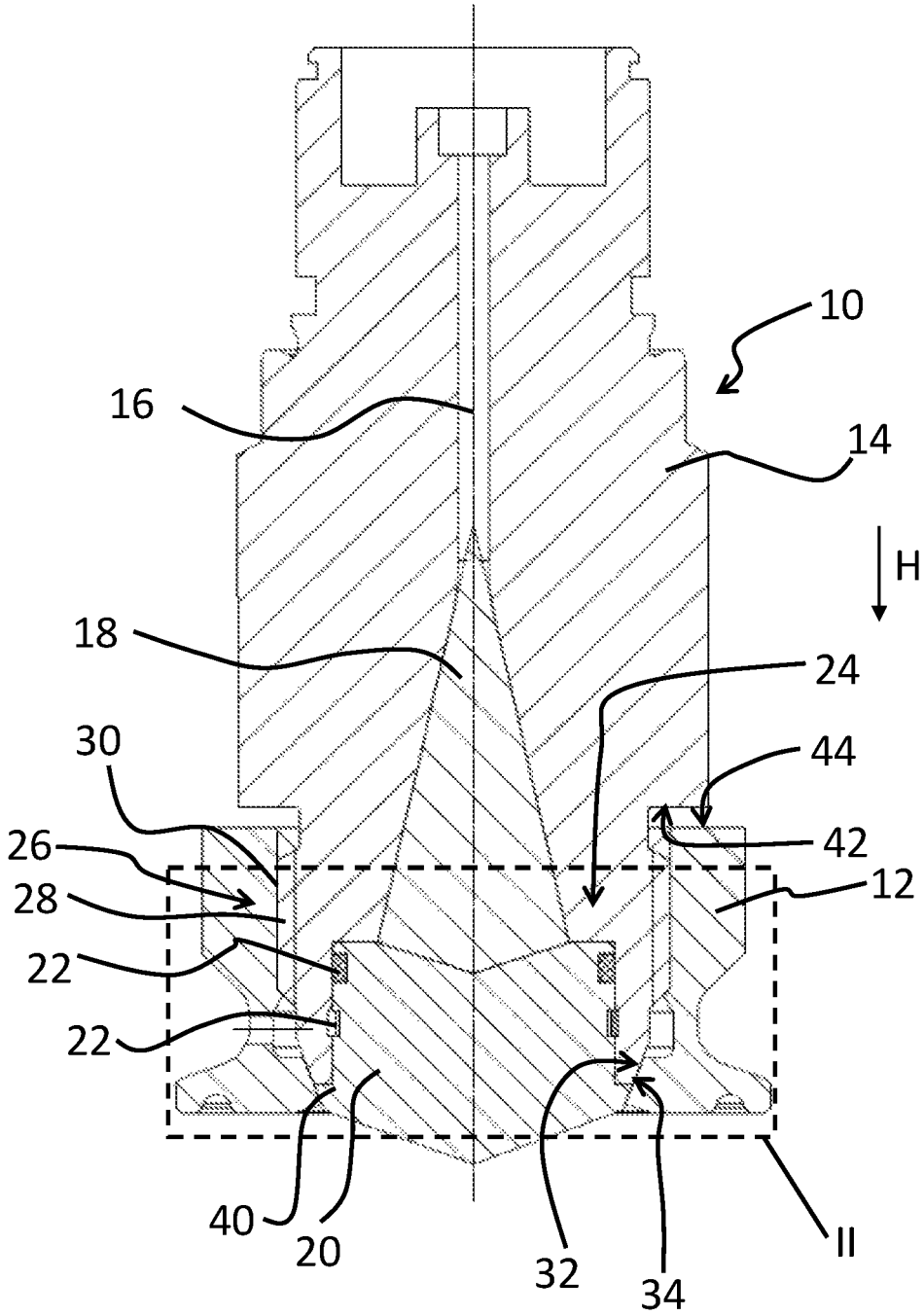
FIG. 1 is a line drawing evidencing an arrangement having a sensor and a holding device in a cross section.

The invention relates to an arrangement of a sensor in a holding device. The sensor is a sensor for detecting a property of a filling material in a container or tube, wherein the term container is used in a general manner in each case in the following. The container has a container interior, into which filling material (solids, liquids or gases) can be poured.

The sensor is used for detecting a parameter of the filling material poured in the container. In this case, that may inter alia be the temperature of the filling material, the pressure in the container or fill level or limit level of the filling material in the container. In particular, the sensor is a fill level sensor, particularly a radar sensor.

The holding device is used for arranging the sensor on a container. The holding device may be part of the container or be present as a separate part. In particular, the holding device is a hygiene adapter in the form of a clamped, welded, flanged or screw-in connector. In particular, the holding device is made from metal. The term holding device is also understood in the present application to mean separate components, which adapt the process connection of the sensor to a holding device of the process environment. For example, the process connection may be designed as a screw-in thread and by means of the holding device, a connection, for example to a different screw-in thread or a clamp holding device, can be effected.

The holding device has a passage opening, into which the sensor can be inserted. The sensor has a process connection, which is arranged at least partially inside the passage opening. The part of a sensor, using which the same can be arranged in a process environment, is termed the process connection. The process connection therefore constitutes the mechanical interface between sensor and process environment. In particular, the process connection has an external thread for screw connection with an internal thread of the holding device.

The holding device has an internal taper in a sub-region of the passage opening. Internal taper in this case means a geometry, in which the inner surface of the passage opening has a decreasing diameter. In particular, the diameter decreases starting from an end of the holding device facing the process. The process connection has an external taper in a sub-region, which is constructed in a manner corresponding to the internal taper of the holder and comes to bear against the same. The two tapered surfaces form a contact surface. In other words, the process connection has a region on its outer surface, the diameter of which increases. In the present case, the diameter increases in particular starting from an end facing the process.

The internal taper and the external taper may be straight surfaces running with a steadily increasing diameter. It is however also conceivable that the internal taper and correspondingly the external taper are designed to be convex.

In particular, the process connection has an external thread and the external taper is arranged on the side of the external thread facing the process. Correspondingly, the holding device has an internal thread and the internal taper is arranged on the side of the internal taper facing the process.

According to the invention, the external taper has two sections, wherein a first section and a second section are constructed from different materials. In particular, these two sections are formed by different components. The two sections are directly adjacent to one another in particular. Preferably, the two sections form a planar and continuous external taper surface.

The advantage of the arrangement according to the invention is that during the connection of the sensor to the holding device (e.g., by screwing in or by clamping), the two corresponding taper surfaces come to bear against one another and are compressed against one another. Due to the two sections made from different material, an independent optimization of the two sections can take place and a particularly good seal can be achieved in the region of the corresponding taper surfaces. This sealing concept with different material pairings with various sealing properties increases the reliability of the seal. The two seal pairs differ with regards to their thermal and dynamic properties. In particular, a separate seal in the form of a sealing ring or similar, which is otherwise provided, can be dispensed with. Here, direct contact is formed, which has fewer gaps or is completely free from dead space. Deposits of the filling material itself are prevented from being able to accumulate in free spaces and/or dead spaces and subsequently, in the event of under pressure in the container, possibly getting into the filling material located in the container. These deposits may contaminate or even spoil the filling material, if the deposits remain in the free space or dead space for a relatively long time.

In a practical embodiment of the arrangement according to the invention, the first and a front section of the external taper facing in the direction of the process is constructed from a dielectric material. The dielectric material may be PEEK, PTFE, PPS, ceramic or glass. If the dielectric material has a certain elasticity, such as e.g. in the case of the use of PEEK, PTFE or PPS, the same can be pressed particularly well against the internal contour of the holding device, and a particularly tight connection or ring seal results between the process connection and the holding device. The holding device is made from metal in particular and constitutes a stable end support for the dielectric material.

In particular, the first section with the dielectric material is part of a lens. Alternatively, the section with the dielectric material may be part of a horn antenna. The sensor is a radar measuring device in particular, for example a radar fill level measuring device, which detects a fill level of a filling material, particularly liquids and bulk goods, located in a container according to the time of flight principle. The radar fill level measuring device is equipped with a horn antenna and/or a lens in particular, by means of which a coupled HF signal is emitted in the direction of the filling material and reflected by the same. The signals reflected by the filling material are detected and evaluated in a combined transmitting and receiving system of the radar fill level measuring device. For beam shaping, it is known that such horn antennas can have a dielectric lens at a front-side end in the main emission direction of an antenna horn. The electromagnetic waves which propagate in a substantially spherical-segment shaped manner in the antenna horn are in this manner transformed into wave fronts which are as parallel as possible and propagate in the main emission direction and thus a directional effect of the antenna is achieved. Both the lens and the horn antenna are usually formed from dielectric material, so that it is particularly practical to use the same directly as part of the process connection.

In a practical embodiment of the arrangement according to the invention, the second, and in particular rear, section facing away from the process is constructed from a metal. In connection with the first section made from dielectric material, two adjacent ring seals of different material pairs therefore result. Starting from the process, the seal is realized first by a combination of the dielectric material (on the sensor side) and metal (on the side of the holding device) and directly adjacent thereto by a material pairing made from metal and metal. This sealing concept with different material pairings with various sealing properties increases the reliability of the seal.

In particular, the second section is formed by the housing of the sensor. The housing of the sensor can be constructed in one or multiple parts and is generally used for protecting the components arranged in the housing, for example electronics for signal processing and an optional display and/or control module. That the front part of the housing is constructed as a process connection means that the front part of the sensor is constructed such that the same can be connected to a process environment. The process connection can be constructed in one piece with the housing or connected to the same. Here, a part of the process connection forms a section of the external taper. In particular, this part of the housing is manufactured from a selected material suitable for the process environment, for example a mechanically and chemically resistant material, for example a suitably alloyed high-grade steel, such as 1.4404 (316L) or 2.4602 (Hastelloy C-22).

The metallic section of the external taper can be provided with an abrasion coating on the outside, for example using silver. This prevents scuffing of the metal surfaces that touch and rub against one another (process connection and holding device). The sealing surface made from dielectric material and facing the process prevents abraded material from getting into the container and the filling material arranged therein.

In a further practical embodiment of the arrangement according to the invention, the external taper has a smaller angle in relation to the axial direction than the internal taper. Therefore, particularly great pressure is exerted on the regions orientated towards the process and a particularly good sealing action is achieved here. In particular, the opening angle of the external taper is 40° and the opening angle of the internal taper is 42°. The angle is continuously uniform over the two-part external taper surface.

It may also be provided that the taper surface of the external taper does not run steadily, but rather the second section has a larger diameter at the transition of the two sections than the first section. In this case, the second section protrudes further in the radial direction than the first section. This is advantageous for example, if the first region is made from a dielectric material, which, like ceramic or glass, is not elastically deformable. During the mounting of the sensor in the holding device, initially the second projecting section is compressed, until the first section also bears against the holding device and a double ring seal is achieved.

In particular, the sensor and correspondingly the holding device form a stop, which delimits the maximum insertion depth of the sensor into the holding device. To this end, the sensor and in particular the housing of the sensor may have a shoulder on the outside, which protrudes radially with respect to the passage opening of the holding device and stops against an end face of the holding device. A force is defined by the stop, using which the two taper surfaces are pressed against one another, and which generates an optimum sealing action. Alternatively, a defined screw-in force (torque) may also be specified, with which the sensor with the process connection should be screwed into the holding device.

The invention also relates to a sensor having a process connection for mounting the sensor in a holding device, wherein the process connection has an external taper, which has at least two sections which are constructed from different material. As already explained previously, this on the one hand allows a double ring seal with two different material pairings and on the other hand makes it possible to dispense with separate seals. A sensor of this type can be arranged particularly well in a sealing manner in a holding device with a passage opening.

The first, in particular front section, which faces the process, is constructed from a dielectric material in particular. The second, in particular rear section, which faces away from the process, is constructed from a metal in particular. In particular, the second section is formed by a housing of the sensor. In particular, the first section is formed by a lens or a horn antenna.

Preferably, the two sections are directly adjacent and form a continuous, planar external taper surface.

The opening angle of the external taper is 40° in particular and also extends beyond the two sections.

The invention further relates to a method for arranging a sensor in a holding device, particularly the arrangement of a sensor as described previously. When inserting the sensor into a passage opening of the holding device, an internal taper of the holding device and an external taper of the sensor are brought to bear against one another and a first section, which is made from dielectric material in particular, and a second section, which is made from metal in particular, of the external taper are pressed against the internal taper and thus a double annular seal (ring seal) is created. Reference is made to the previous description with respect to the advantages connected to the method.

The maximum insertion depth of the sensor into the passage opening of the holding device is defined in particular by a stop and/or a maximum screw-in force. As a result, the contact force of the two corresponding taper surfaces with respect to one another is likewise defined in a simple manner.

DETAILED DESCRIPTION OF THE FIGURES

An arrangement made up of a sensor 10 and a holding device 12 is shown in FIG. 1. The holding device 12 is illustrated here as a separate component and is used for connecting the sensor 10 to a container (not illustrated).

The sensor 10 is a radar measuring device for determining a fill level in a container. The sensor 10 has a housing 14, which is made from metal here. In an upper part of the housing 14, which faces away from the process, electronics (not illustrated) can be arranged and inter alia there is also a transmitting and receiving unit for generating radar beams. The radar beams propagate in the main emission direction E in the direction of the process through a waveguide 16 constructed in the housing 14. A horn antenna 18, which is here constructed completely from a dielectric material, is further arranged in the housing 14. A separate lens 20 is arranged on the housing 14 adjacent to the horn antenna 18 in the main emission direction E. The lens 20 is likewise made from a dielectric material. The lens 20 is arranged in an opening in the housing 14. The interior of the housing 14 is sealed by means of seals 22 between the lens 20 and the housing 14. The lens 20 is constructed to be convex in the embodiment shown. However, a concave or plane geometry of the lens 20 is also conceivable.

The sensor 10 is here arranged in a holding device 12, wherein the holding device 12 has a passage opening 24, in which the sensor 10 is partially arranged.

The region of the sensor 10, which is used for connection to the holding device 12, is termed the process connection 26. In the present case, the process connection 26 has an external thread 28, which is arranged in a corresponding internal thread 30 in the holding device 12 (cf. also FIGS. 2 and 3).

At the end of the holding device 12 facing the process, the holding device 12 has an internal taper 32. The internal taper 32 is arranged on the side of the internal thread 30 facing the process. Correspondingly, the sensor 10 has an external taper 34. The external taper 34 is arranged on the side of the external thread 28 facing the process. The external taper 34 of the sensor 10 has two sections 36, 38 (cf. FIG. 2 and FIG. 3). A first section 36, a front section here, forms the section 36 facing the process and a second section 38, a rear section here, forms the section 38 facing away from the process. The first section 36 and the second section 38 adjoin one another directly. The two sections 36, 38 form a continuous and planar external taper 34.

The first section 36 is constructed from a dielectric material, from PEEK here. The first section 36 is formed by a part of the lens 20 in the embodiment shown. The second, rear section 38 is formed by the housing 14 and in the present case is made from metal. The holding device 12 is likewise made from metal.

The internal taper 32 and the external taper 34 bear against one another. Both sections 36, 38 and two materials of the external taper 34 bear against the internal taper 32. The first section 36 made from the dielectric material is elastically deformable here and, when the sensor 10 is connected to the holding device (by screwing in), is compressed with the opposite metal of the internal taper 32. Overall, due to the material pairs dielectric material/metal and metal/metal, a double and therefore a particularly good ring seal is created.

The lens 20 has a collar 40, which protrudes with respect to the circumference of the adjacent regions and the free end of which forms the first section 36. The collar 40 can also be seen as a type of driver, against which the housing 14 bears and on which during the screwing of the sensor 10 into the holding device 14, a force acts downwards in the direction of the process.

Figures 2, 3:
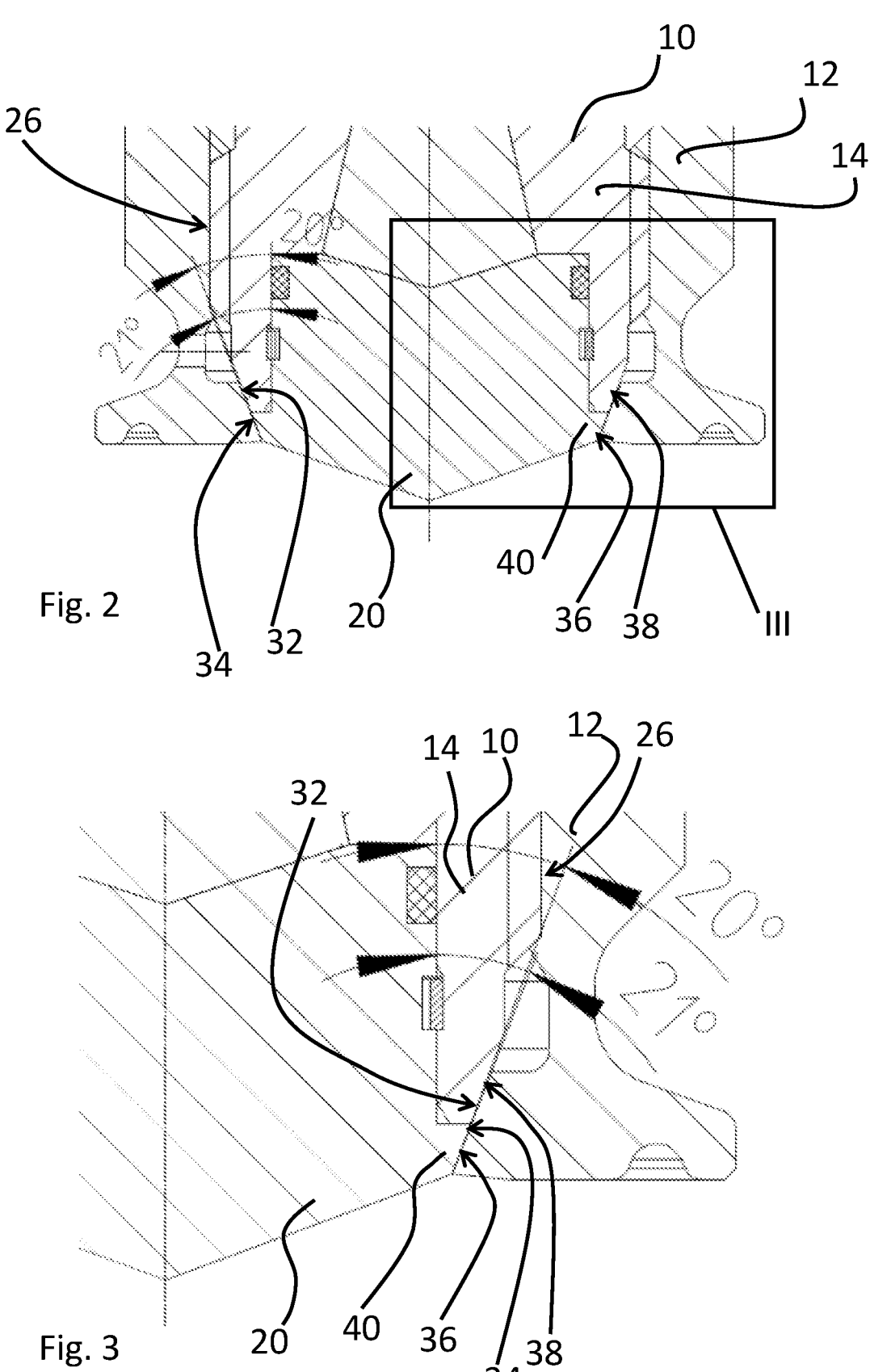
FIG. 2 is a line drawing evidencing the region labelled with II from FIG. 1 in an enlarged illustration in cross section.
FIG. 3 is a line drawing evidencing the region labelled with III from FIG. 2 in an enlarged illustration in cross section.

As can be seen in FIGS. 2 and 3, the external taper 34 has an opening angle of 40° or a half opening angle of 20° (with respect to the axial direction). The internal taper 34 has an opening angle of 42° or a half opening angle of 21°.

In order to define the maximum insertion depth of the sensor 10 into the holding device 12 and the maximum press-in force on the taper surfaces 32, 34, the housing 14 has a stop 42 in the form of a projection which has a larger diameter than the passage opening 24 of the holding device 14. The projection 42 hits the end side 44 of the holding device 12 at maximum insertion depth.

During the insertion of the sensor 10 into the passage opening 12, the process connection 26 is located in the passage opening 24. The internal taper 32 of the passage opening 24 and the external taper 34 of the process connection 26 then come to bear against one another. Due to the screwing in, the sensor 10 moves relatively to the holding device 12 in the direction of the process, so that a force is exerted onto the taper surfaces 32, 34. Two ring seals lying one behind the other and with different properties then result at the taper surfaces 32, 34 with the material pairings dielectric material/metal and metal/metal, which bear against one another.

LIST OF REFERENCE NUMBERS

10 Sensor
12 Holding device
14 Housing
16 Waveguide
18 Horn antenna
20 Lens
22 Seal
24 Passage opening
26 Process connection
28 External thread (process connection)
30 Internal thread (holding device)
32 Internal taper (holding device)
34 External taper (process connection)
36 First section
38 Second section
40 Collar
42 Stop
44 End side
E Main emission direction Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. An arrangement of a sensor in a holding device, the holding device having a passage opening and the sensor having a process connection, which is arranged at least partially inside the passage opening, wherein the holding device has an internal taper in a sub-region of the passage opening and the process connection has an external taper in a sub-region, which is constructed in a manner corresponding to the internal taper of the holding device and comes to bear against the same, wherein the external taper has a first section and a second section, wherein the first section and the second section are constructed from different materials and wherein the first section and the second section of the external taper each directly bear against the internal taper of the passage opening.

2. The arrangement according to claim 1, wherein the first section is constructed from a dielectric material.

3. The arrangement according to claim 1, wherein the first section of the external taper is part of a lens for emitting a coupled HF signal.

4. The arrangement according to claim 1, wherein the second section is constructed from metal.

5. The arrangement according to claim 4, wherein the metal is provided with an abrasion coating on the outside.

6. The arrangement according to claim 1, wherein the second section is formed by a housing of the sensor.

7. The arrangement according to claim 1, wherein the external taper has a smaller angle in relation to the axial direction than the internal taper.

8. The arrangement according to claim 1, wherein the sensor and correspondingly the holding device form a stop, which delimits the maximum insertion depth of the sensor into the holding device.

9. A method for mounting the sensor of claim 1 in a holding device having a passage opening, wherein when inserting the sensor into the holding device, an internal taper of the holding device and an external taper of the sensor are arranged such that they directly bear against one another and a first section and a second section of the external taper of the process connection are directly pressed against the internal taper of the passage opening and thus a double annular seal is created.

10. The method according to claim 9, wherein a maximum insertion depth of the sensor into the holding device is defined by a stop and/or a maximum screw-in force.

\* \* \* \* \*